(12) United States Patent
Hamano

(10) Patent No.: US 7,565,614 B2
(45) Date of Patent: Jul. 21, 2009

(54) IMAGE DATA PROCESSING APPARATUS AND IMAGE DATA PROCESSING METHOD FOR A VIDEO CONFERENCE SYSTEM

(75) Inventor: Hiroshi Hamano, Kanagawa (JP)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 10/834,739

(22) Filed: Apr. 29, 2004

(65) Prior Publication Data

US 2004/0217946 A1  Nov. 4, 2004

(30) Foreign Application Priority Data

May 2, 2003  (JP)  ............................ P2003-127497

(51) Int. Cl.
    *G06F 3/00*  (2006.01)
(52) U.S. Cl. ...................... 715/753; 715/759
(58) Field of Classification Search ................. 715/751, 715/753, 759
    See application file for complete search history.

(56) References Cited

U.S. PATENT DOCUMENTS

| 5,392,223 | A | * | 2/1995 | Caci ........................... 709/218 |
| 5,446,491 | A | * | 8/1995 | Shibata et al. ........... 348/14.09 |
| 5,574,838 | A | * | 11/1996 | Politis et al. ................. 345/440 |
| 5,940,082 | A | * | 8/1999 | Brinegar et al. ............. 345/442 |
| 5,983,263 | A | * | 11/1999 | Rothrock et al. ............ 709/204 |
| 6,556,724 | B1 | * | 4/2003 | Chang et al. ................ 382/299 |
| 7,162,699 | B1 | * | 1/2007 | Pena-Mora et al. ......... 715/751 |
| 2002/0087592 | A1 | * | 7/2002 | Ghani ........................ 707/500 |
| 2003/0095113 | A1 | * | 5/2003 | Ma et al. ..................... 345/175 |
| 2005/0034079 | A1 | * | 2/2005 | Gunasekar et al. .......... 715/753 |
| 2006/0168561 | A1 | * | 7/2006 | Wood .......................... 717/109 |

* cited by examiner

*Primary Examiner*—Sy D Luu
(74) *Attorney, Agent, or Firm*—Frommer Lawrence & Haug LLP; William S. Frommer; Ellen Marcie Emas

(57) ABSTRACT

This invention provides a data processing apparatus and a data processing method for reducing the amount of image data denoting a pattern drawn on a whiteboard by a pen or the like being moved so as to designate locations in a designated sequence. Specifically, a coordinate transformation circuit transforms first-precision coordinate data within first image data into coordinate data of a second precision lower than the first precision, thereby generating second image data. Given the coordinate data in the second image data, a changing point detection circuit detects the coordinate data that are changed in keeping with the locations being designated movably by the pen on the whiteboard, thereby generating third image data including the detected coordinate data in the designated sequence.

8 Claims, 11 Drawing Sheets

F I G. 4
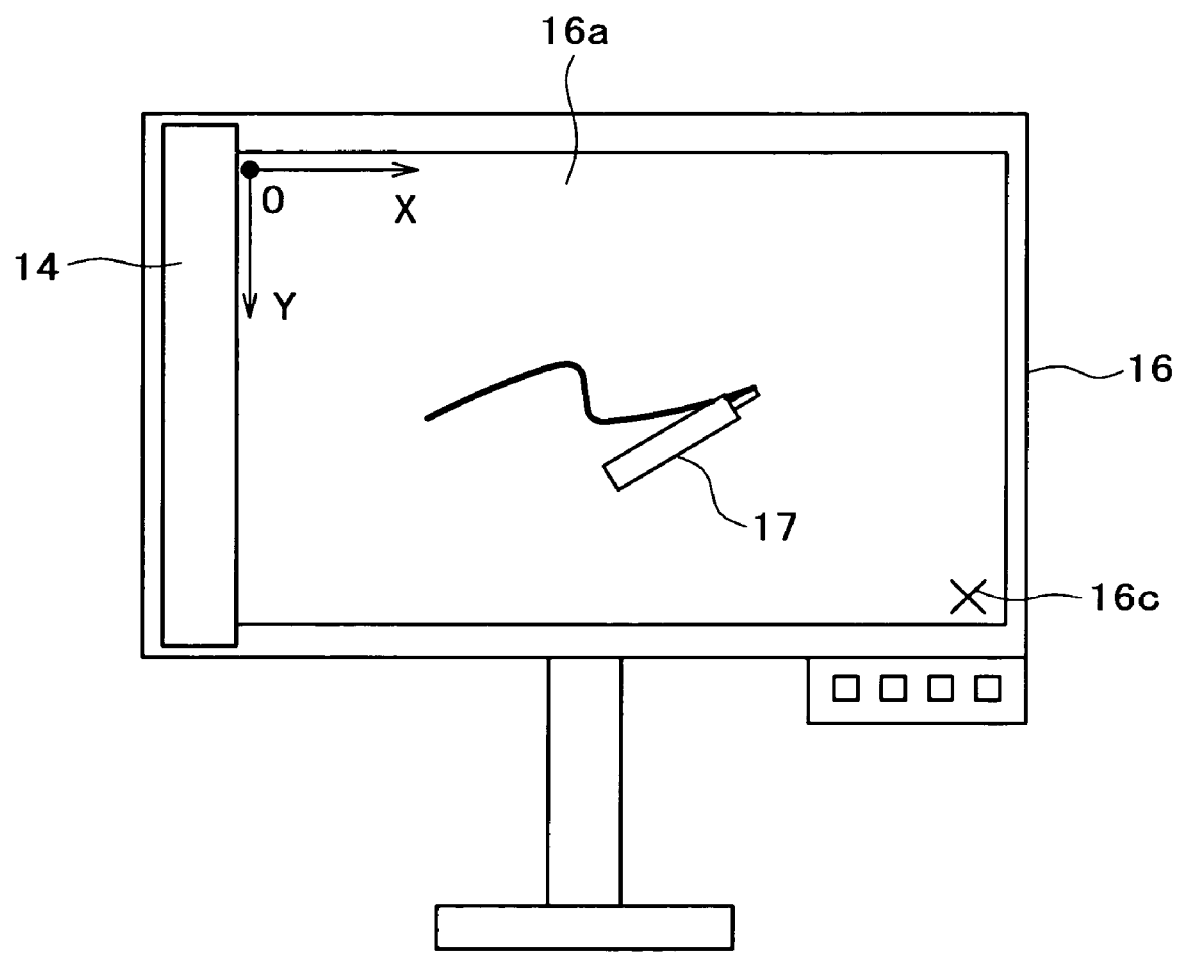

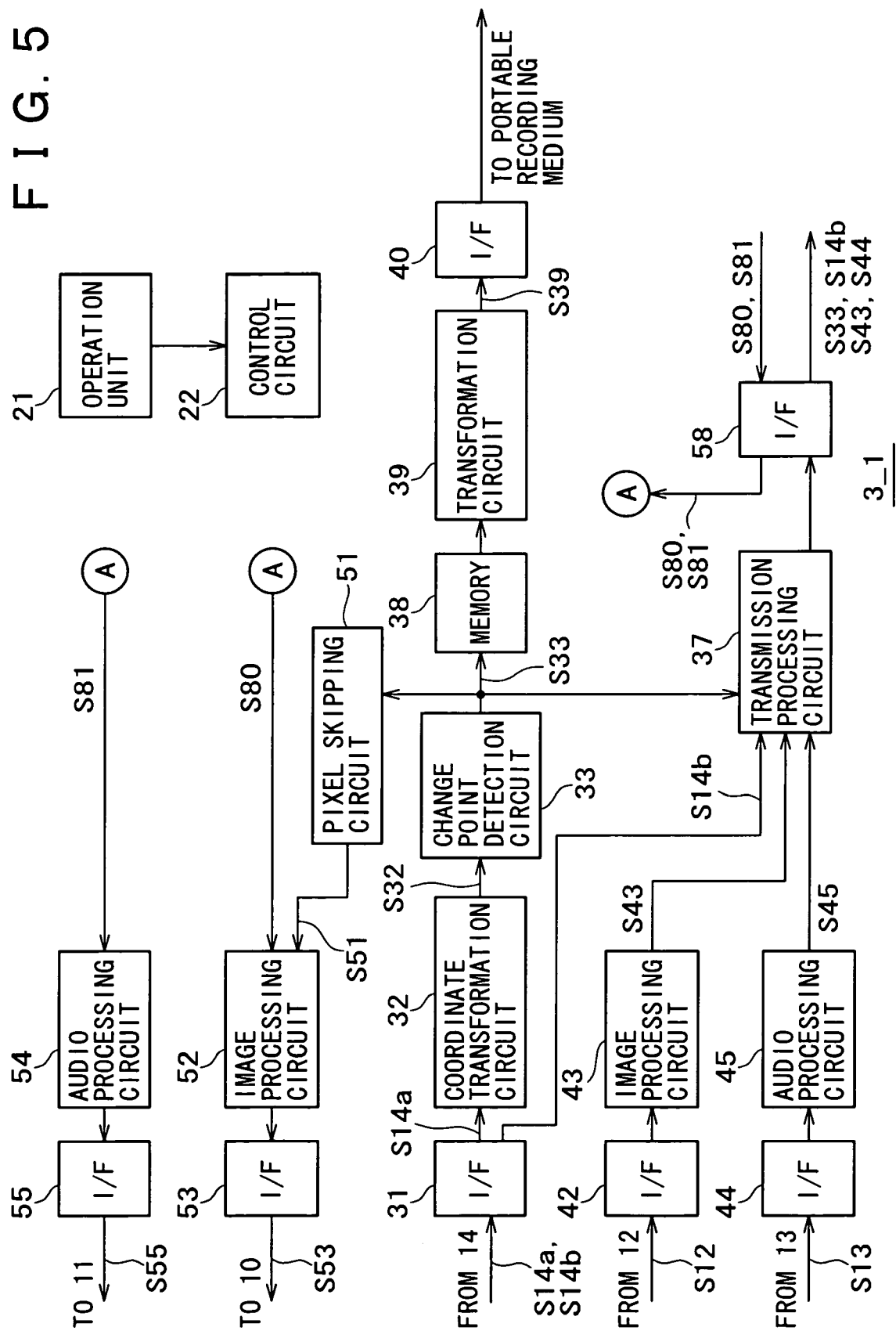

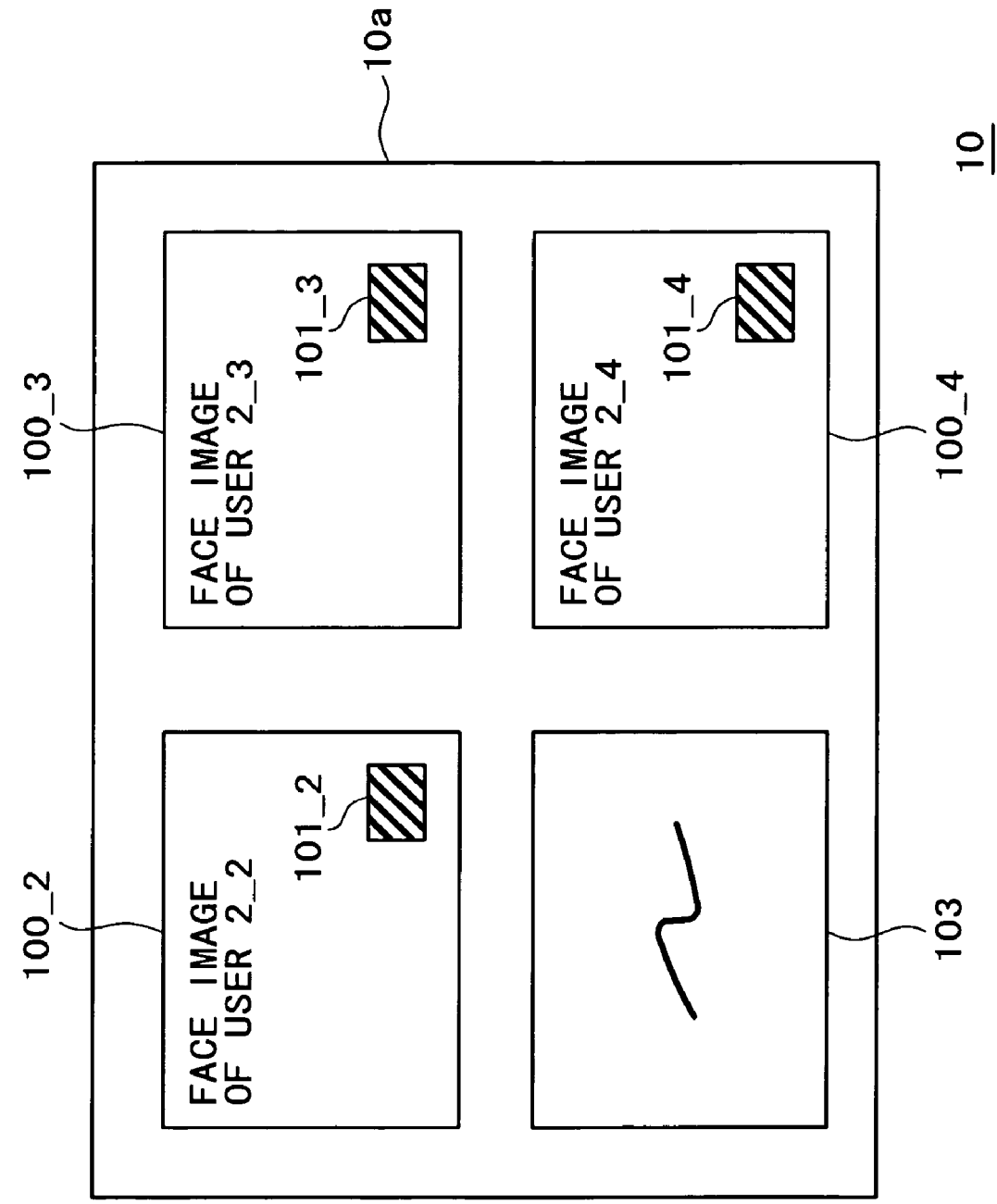

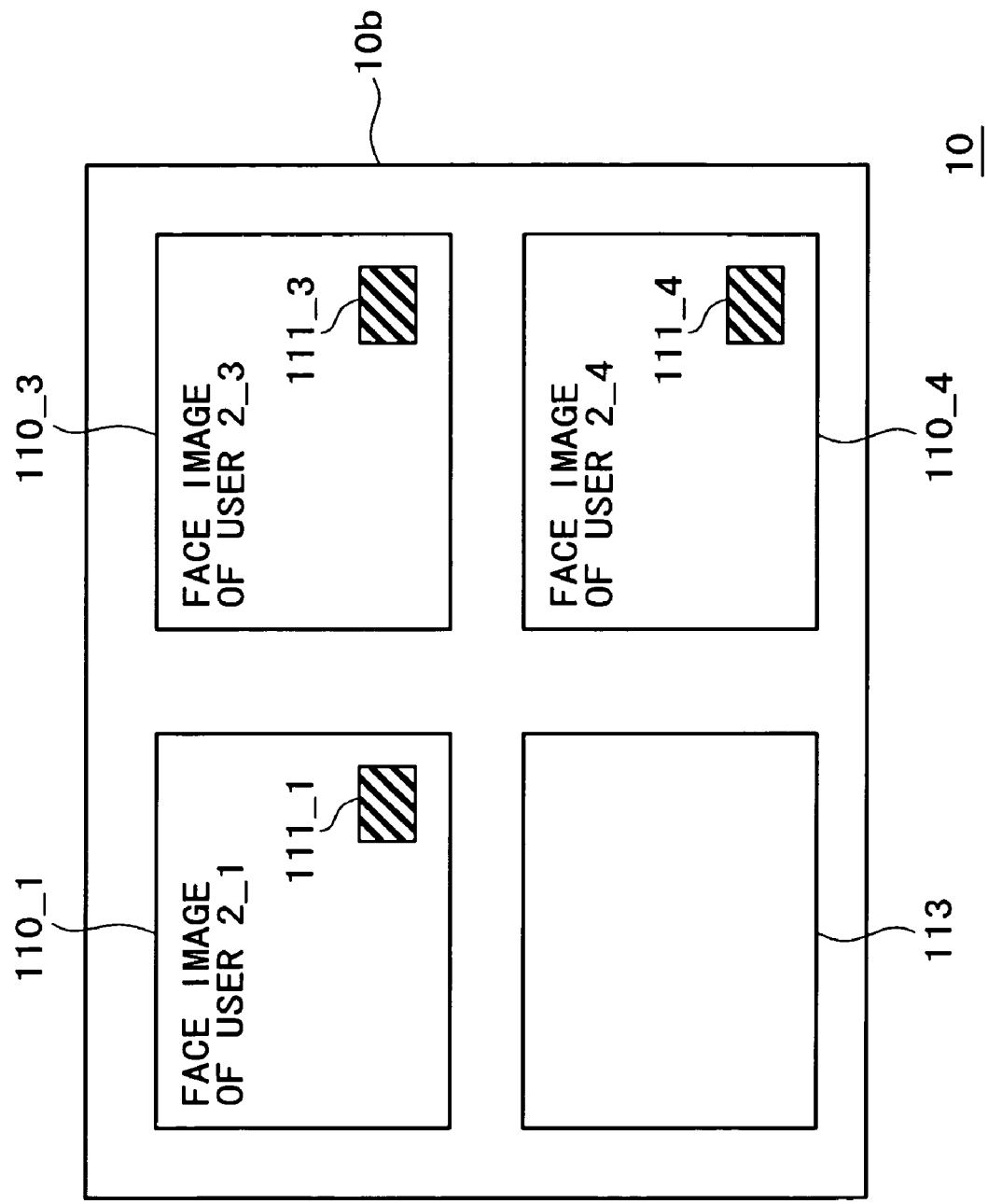

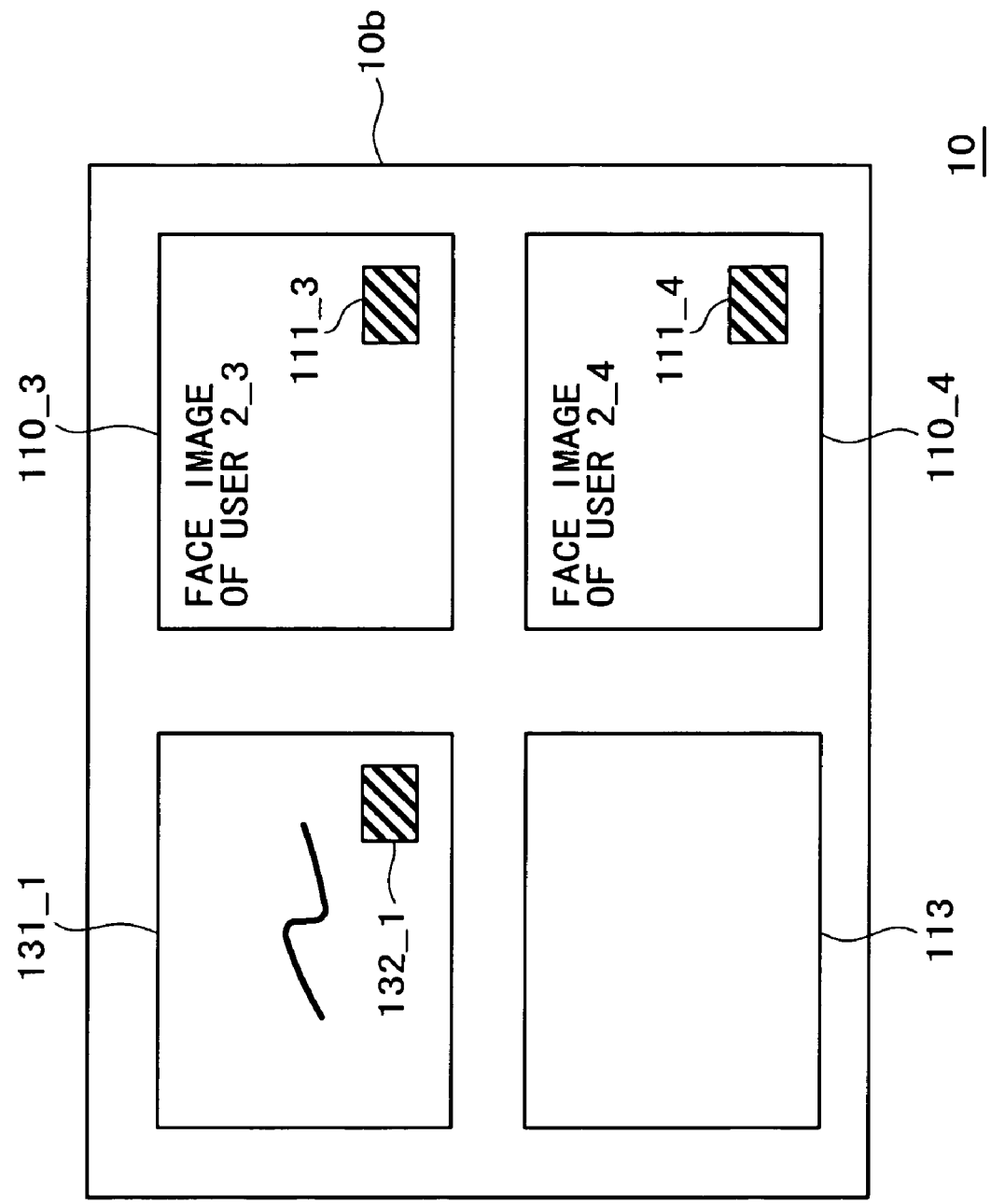

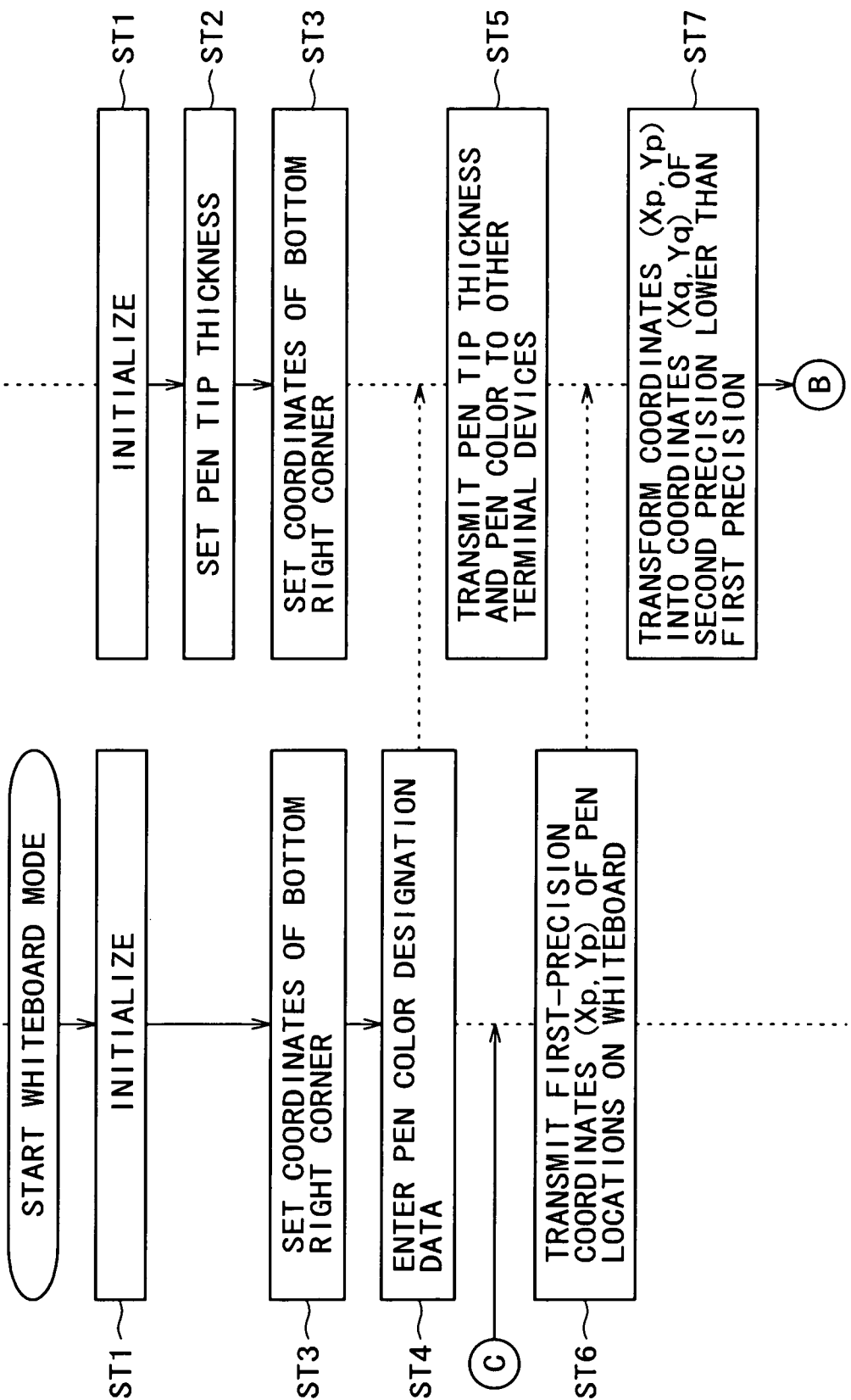

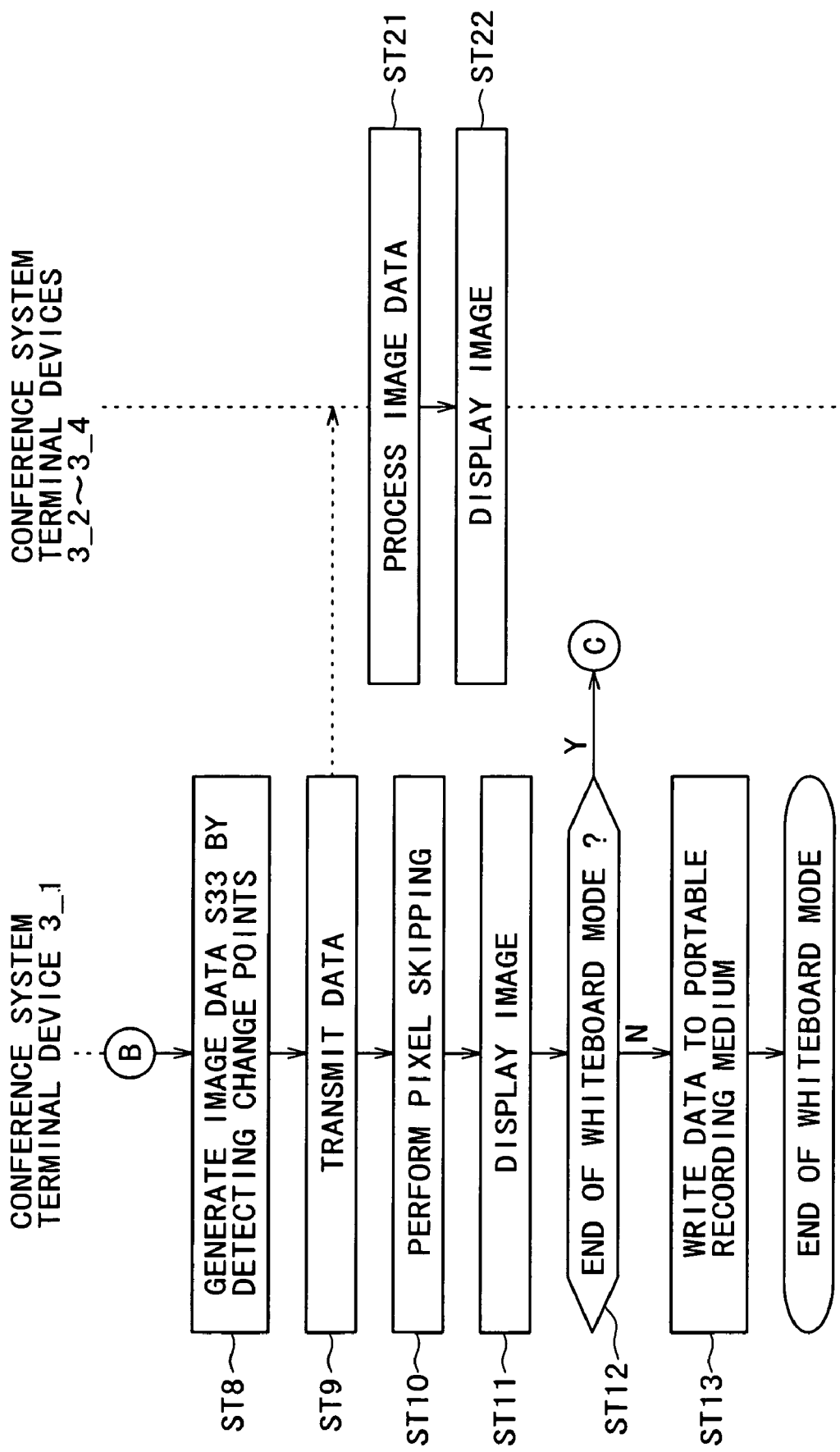

IMAGE DATA PROCESSING APPARATUS AND IMAGE DATA PROCESSING METHOD FOR A VIDEO CONFERENCE SYSTEM

BACKGROUND OF THE INVENTION

The present invention relates to a data processing apparatus and a data processing method for processing image data representing patterns drawn on a whiteboard or the like.

There exist conference systems that illustratively allow users to communicate with one another through their terminal devices while proceeding with a conference. In a typical conference system, a camera and a microphone mounted on each terminal device pick up each user's face image and voice and transmit the collected data to other terminal devices in a communication format specific to the system. Given the transmitted data, the other terminal devices output the other users' face images and voices accordingly.

Speakers in a conference often resort to the whiteboard or like equipment to reinforce their presentations or explanations. Typically, however, conventional conference systems of the above-mentioned type have no capability to let the patterns drawn on the whiteboard be transmitted to the other participants' terminal devices for display.

Meanwhile, there exist data processing apparatuses for transforming the patterns drawn on the whiteboard into electronic data. In such a data processing apparatus, locations plotted by a pen drawing patterns on the whiteboard are detected, and the detected locations are used as a basis for generating the electronic data representative of the patterns.

Problems have been encountered where the electronic data thus generated are transmitted from one terminal device to another. The snag is attributable to the reduced efficiency in transmitting a large quantity of electronic data in excess of the resolution of display on the destination terminal device.

Another problem is that the communication format stipulated for use with the conference system imposes constraints on the amount of electronic data that may be sent to terminal devices to reproduce the patterns originally drawn on the whiteboard.

SUMMARY OF THE INVENTION

The present invention has been made in view of the above circumstances and provides a data processing apparatus and a data processing method for reducing the amount of image data representing a visually perceptible pattern drawn by visualizing means such as a pen being moved to designate locations within a two-dimensional visualization area such as the whiteboard.

In carrying out the invention and according to a first aspect thereof, there is provided a data processing apparatus for generating image data representative of a visually perceptible pattern drawn inside a two-dimensional visualization area by visualizing means being moved therein so as to designate locations in a designated sequence within the area, the data processing apparatus including: inputting means for inputting first image data including a plurality of first location data which denote with a first precision the locations designated by the visualizing means in the designated sequence within the visualization area; transforming means for transforming the first location data included in the first image data input by the inputting means, into second location data with a second precision lower than the first precision, thereby generating second image data; and change detecting means which, given the second location data in the second image data generated by the transforming means, detects those pieces of second location data which are changed in keeping with the designated locations being moved, thereby generating third image data including the detected second location data in the designated sequence.

The inventive data processing apparatus outlined above works as follows: the inputting means initially inputs first image data including a plurality of first location data which denote with a first precision the locations designated by the visualizing means in the designated sequence within the visualization area. The transforming means then transforms the first location data included in the first image data input by the inputting means, into second location data with a second precision lower than the first precision, thereby generating second image data. Given the second location data in the second image data generated by the transforming means, the change detecting means detects those pieces of second location data which are changed in keeping with the designated locations being moved, thereby generating third image data including the detected second location data in the designated sequence.

According to a second aspect of the invention, there is provided a data processing method for generating image data representative of a visually perceptible pattern drawn inside a two-dimensional visualization area by visualizing means being moved therein so as to designate locations in a designated sequence within the area. The data processing method includes the steps of: inputting first image data including a plurality of first location data which denote with a first precision the locations designated by the visualizing means in the designated sequence within the visualization area; transforming the first location data included in the first image data, into second location data with a second precision lower than the first precision, thereby generating second image data; and given the second location data in the second image data generated in the transforming step, detecting those pieces of second location data which are changed in keeping with the designated locations being moved, thereby generating third image data including the detected second location data in the designated sequence.

The data processing method outlined above according to the invention works as follows: first image data are initially input, including a plurality of first location data which denote with a first precision the locations designated by the visualizing means in the designated sequence within the visualization area. The first location data included in the first image data are transformed into second location data with a second precision lower than the first precision, whereby second image data are generated. Of the second location data in the second image data generated in the transforming step, those pieces of second location data which are changed in keeping with the designated locations being moved are detected, whereby third image data including the detected second location data in the designated sequence are generated.

As outlined above, the invention provides a data processing apparatus and a data processing method for reducing the amount of image data representing a visually perceptible pattern drawn by visualizing means being moved to designate locations within a two-dimensional visualization area.

Other objects, features and advantages of the present invention will become more apparent in the following specification and accompanying drawings.

BRIEF DESCRIPTION OF THE DRAWINGS

FIG. 4 is an explanatory view of a whiteboard and a whiteboard data generation unit shown in FIG. 2;

FIG. 5 is a function block diagram of the conference system terminal device shown in FIGS. 1 and 2;

FIG. 7 is an explanatory view of a screen appearing on a display unit connected to the conference system terminal device shown in FIG. 1;

FIG. 8 is an explanatory view of another screen appearing on the display unit connected to the conference system terminal device shown in FIG. 1;

FIG. 9 is an explanatory view of another screen appearing on the display unit connected to the conference system terminal device shown in FIG. 1;

FIG. 10 is a schematic flow diagram showing how the conference system of FIG. 1 typically operates; and FIG. 11 is a schematic flow diagram continued from FIG. 10 and further indicating how the conference system of FIG. 1 operates.

DETAILED DESCRIPTION OF THE PREFERRED EMBODIMENTS

Figure 1:
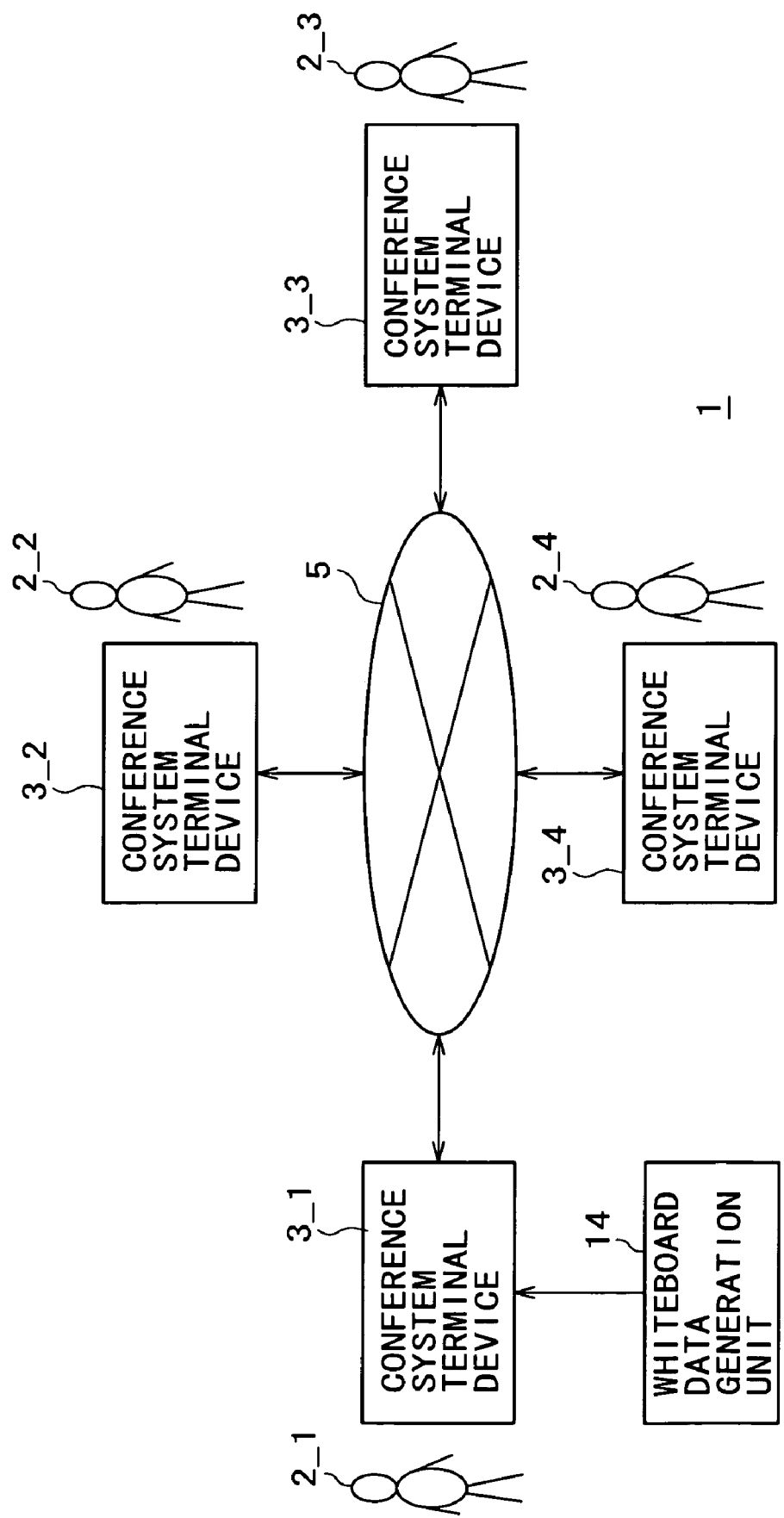
FIG. 1 is a schematic view showing an overall configuration of a conference system embodying the invention.
Figure 2:
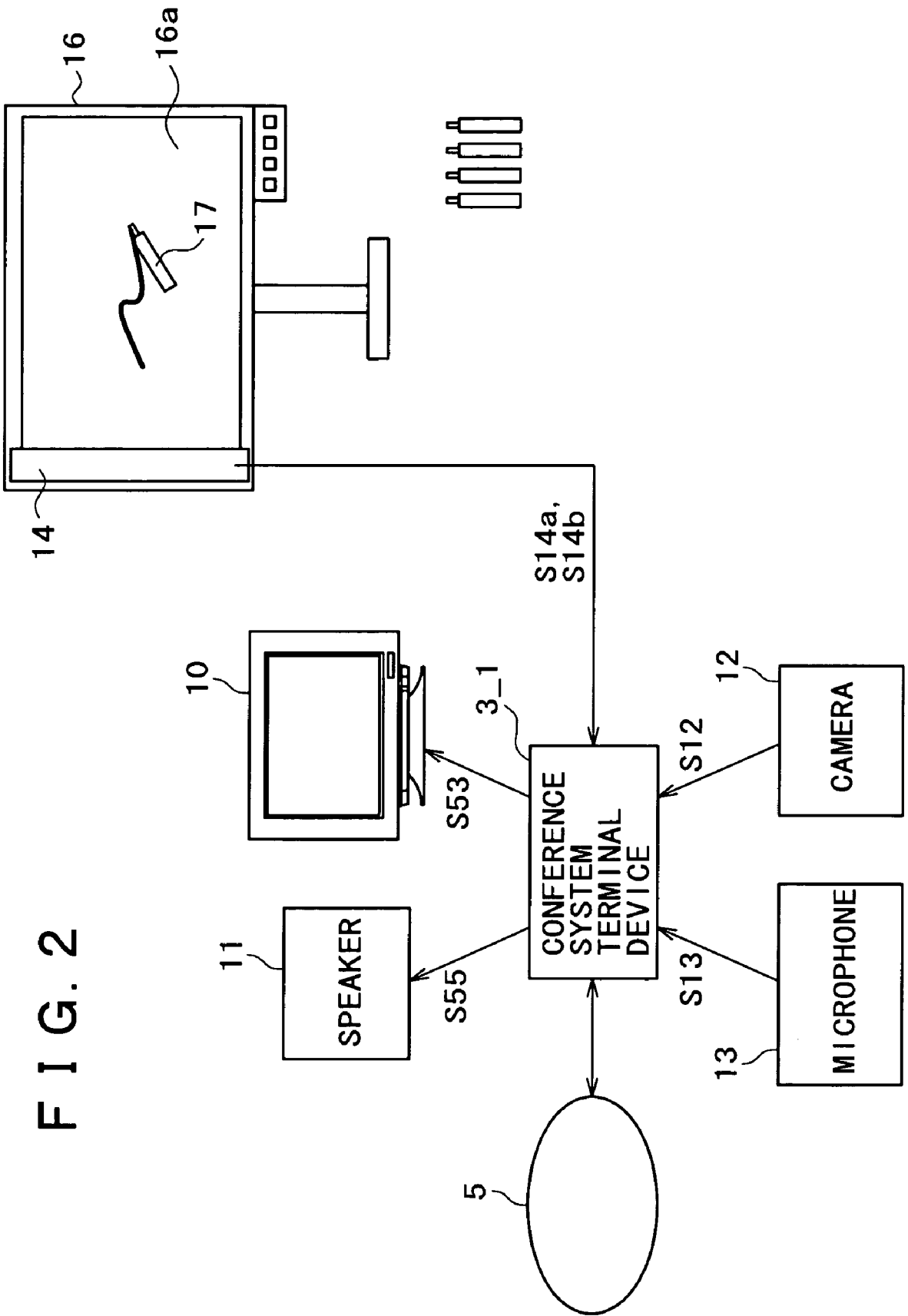
FIG. 2 is an explanatory view of equipment connected to a conference system terminal device shown in FIG. 1.

A conference system embodying this invention will now be described. FIG. 1 schematically shows an overall configuration of a typical conference system embodying the invention. FIG. 2 is an explanatory view of equipment connected to one conference system terminal device 3_1 shown in FIG. 1.

As shown in FIG. 1, the conference system 1 has conference system terminal devices 3_1, 3_2, 3_3 and 3_4 interconnected via a network 5. The conference system terminal device 3_1 is connected to a whiteboard data generation unit 14 attached to a whiteboard 16, as depicted in FIG. 2.

On a two-dimensional board unit 16a (visualization area of the invention) of the whiteboard 16, a user 2_1 moves a pen 17 (visualizing means of the invention) to designate locations thereby drawing a visually perceptible pattern on the board unit 16a.

The whiteboard data generation unit 14 generates image data including a plurality of coordinate data (first coordinate data of the invention) representing, with a first precision (of the invention), the coordinates of the locations touched (i.e., designated) in sequence by the pen 17 within the board unit 16a.

The conference system terminal device 3_1 inputs the image data generated by the whiteboard data generation unit 14, and transforms the coordinate data within the image data into coordinate data (second location data of the invention) of a second precision (of this invention) lower than the first precision, thereby generating new image data (second image data of the invention).

Given the coordinate data in the image data obtained through the coordinate transformation, the conference system terminal device 3_1 detects those pieces of coordinate data which are changed in keeping with the locations being designated movably by the pen 17, thereby generating image data (third image data of the invention) including the detected coordinate data in the designated sequence. The generated image data are transmitted to the conference system terminal devices 3_2 through 3_4.

The network 5 shown in 1 is illustratively a network based on public switched lines or leased lines.

Figure 3:
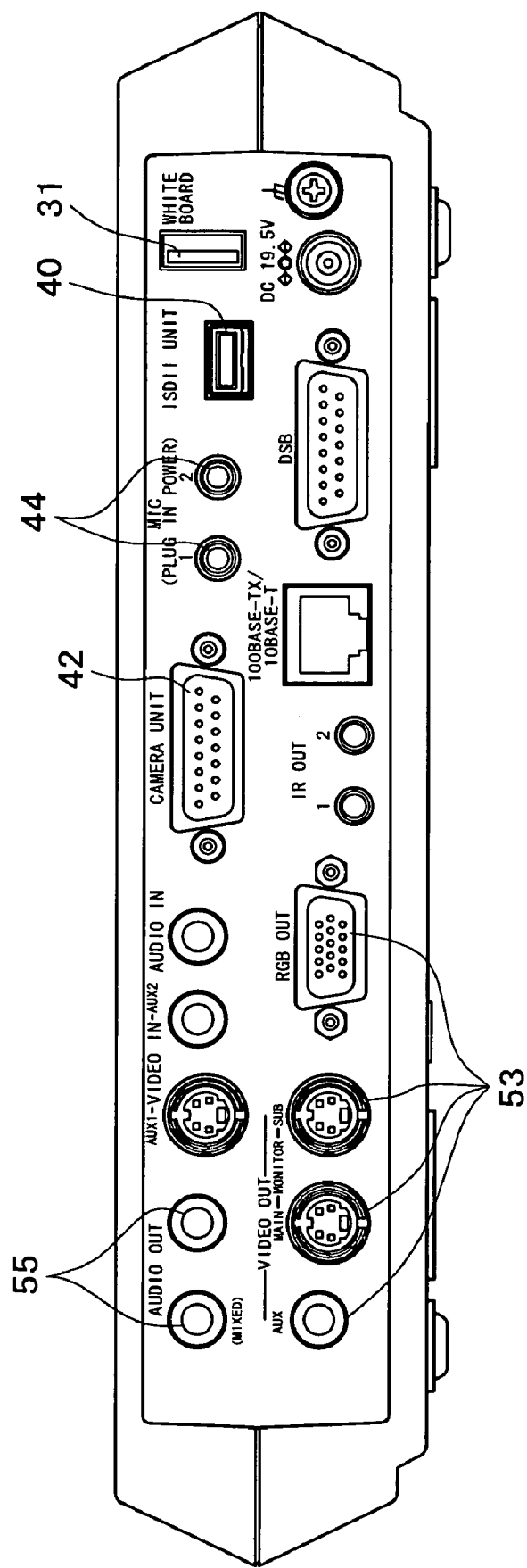
FIG. 3 is an external view of interfaces for the conference system terminal device shown in FIG. 2.

The conference system terminal device 3_1 will now be described. FIG. 2 is an explanatory view of equipment connected to the conference system terminal device 3_1. FIG. 3 is an external view of interfaces for the conference system terminal device 3_1 shown in FIG. 2. FIG. 4 is an explanatory view of the whiteboard 16 and whiteboard data generation unit 14. FIG. 5 is a function block diagram of the conference system terminal device 3_1. With this embodiment, the conference system terminal devices 3_1 through 3_4 are assumed to have the same structure.

[Equipment to be Connected]

The equipment to be connected with the conference system terminal device 3_1 is described below. As shown in FIG. 2, the conference system terminal device 3_1 is connected illustratively to a display unit 10, a speaker 11, a camera 12, a microphone 13, and the whiteboard data generation unit 14.

The display unit 10 is illustratively an RGB type display unit with a resolution of 1024×768 points or dots, or an NTSC or PAL type display unit with a 640×480 dot resolution. The display unit 10 displays an image corresponding to a teleconference image signal S53 input from the conference system terminal device 3_1. Illustratively, the display unit 10 is plugged into interface terminals 53 of the conference system terminal device 3_1 as shown in FIG. 3.

The speaker 11 provides audio output corresponding to a teleconference audio signal S55 input from the conference system terminal device 3_1. Illustratively, the speaker 11 is plugged into interface terminals 55 of the conference system terminal device 3_1 as shown in FIG. 3.

The camera 12 takes a picture of, say, the user's face at the conference system terminal device 3_1 and outputs a corresponding picture signal S12 to the terminal device 3_1. Illustratively, the camera 12 is plugged into an interface terminal 42 of the conference system terminal device 3_1 as shown in FIG. 3.

The microphone 13 generates an audio signal S13 representing, say, the user's voice at the conference system terminal device 3_1 and outputs a corresponding audio signal S13 to the terminal device 3_1. Illustratively, the microphone 13 is plugged into interface terminals 44 of the conference system terminal device 3_1 as shown in FIG. 3.

The conference system terminal device 3_1 is connected via an interface terminal 40 shown in FIG. 3 to the network 5 depicted in FIGS. 1 and 2.

The whiteboard data generation unit 14 detects a pattern drawn by the pen 17 on the board unit 16a of the whiteboard 16 as indicated in FIG. 4. More specifically, when the tip of the pen 17 touches the board unit 16a, the whiteboard data generation unit 14 detects coordinates of the touched locations with a first precision in an X-Y coordinate system established on the board unit 16a, generates image data S14a (first image data of the invention) including coordinate data (Xp, Yq) denoting the touched coordinates in a touched sequence, and outputs the generated image data S14a to the conference system terminal device 3_1. Illustratively, the whiteboard data generation unit 14 outputs to the terminal device 3_1 the image data S14a at a rate of 90 coordinate data (Xp, Yq) per second.

The X-Y coordinate system has its origin O located in the top left corner of the board unit 16a as shown in FIG. 4.

The first precision (i.e., resolution) for coordinate detection by the whiteboard data generation unit 14 is defined illustratively by a maximum value of 8,000 dots along the X coordinate axis and a maximum value of 6,000 dots along the Y coordinate axis on the board unit 16a. That is, the whiteboard data generation unit 14 expresses locations on the board unit 16a using coordinates of 8,000 by 6,000 dots or points.

In addition to the image data S14a, the whiteboard data generation unit 14 may illustratively output to the conference system terminal device 3_1 control data S14b indicating a contact of the pen 17 onto the board unit 16a as well as control data S14b denoting a separation of the pen 17 from the board unit 16a.

The data sent from the whiteboard data generation unit 14 to the conference system terminal device 3_1 are supplemented illustratively with error-correcting code. The coordinate data output from the whiteboard data generation unit 14 to the conference system terminal device 3_1 are divided into a higher-order bit group and a lower-order bit group where necessary.

The whiteboard data generation unit 14 is plugged into an interface terminal 31 shown in FIG. 3. The data from the whiteboard data generation unit 14 are output through the interface terminal 31 to the conference system terminal device 3_1.

This embodiment of the invention utilizes a plurality of pens 17 for drawing in different colors. Each pen 17 is furnished with a button. When the user pushes the button of the pen 17, the whiteboard data generation unit 14 identifies the color of the pen 17 being used. Color data representative of the color of the pen 17 are output from the whiteboard data generation unit 14 to the conference system terminal device 3_1.

[Structure of the Conference System Terminal Device 3_1]

As shown in FIG. 5, the conference system terminal device 3_1 illustratively includes an operation unit 21, a control circuit 22, an interface 31, a coordinate transformation circuit 32, a change point detection circuit 33, a transmission processing circuit 37, a memory 38, a transformation circuit 39, an interface 40, an interface 42, an image processing circuit 43, an interface 44, an audio processing circuit 45, a pixel skipping circuit 51, an image processing circuit 52, an interface 53, an audio processing circuit 54, an interface 55, and an interface 58.

The interface 31 corresponds to the inputting means, the coordinate transformation circuit 32 to the transforming means, the change point detection circuit 33 to the change detecting means, and the transmission processing circuit 37 to the transmitting means of this invention. The image processing circuit 52 and audio processing circuit 54 correspond to image processing means and audio processing means of this invention, respectively.

The operation unit 21 is illustratively made up of a keyboard, a mouse, and/or a touch panel. When operated by the user, the operation unit 21 outputs an operation signal reflecting the user's operation to the control circuit 22.

The control circuit 22 provides overall control on the workings of the components of the conference system terminal device 3_1. At any given point in time, only one of the conference system terminal devices 3_1 through 3_4 of this embodiment can transmit image data from the whiteboard to the other terminal devices. In other words, token passing is implemented for control over the conference system terminal devices 3_1 through 3_4. One of the terminal devices which has acquired the token is authorized to transmit image data from the whiteboard to the other devices.

The token passing scheme above is controlled by the control unit 22. Under this scheme, one of the terminal devices with the token acts as a master while the other terminals serve as slaves.

Illustratively, when the control circuit 22 receives from the operation unit 21 an operation signal representing a request for transition to whiteboard mode, the control circuit 22 transmits a whiteboard mode request to the conference system terminal devices 3_2 through 3_4 via the interface 58. Upon receipt of whiteboard mode permission from the conference system terminal devices 3_2 through 3_4, the control circuit 22 enters the whiteboard mode. If the image data S14a are sent from the whiteboard data generation unit 14 to the interface 31 while the whiteboard mode is not in effect, the control circuit 22 causes the display unit 10 to display an error message.

The interface 31 outputs to the coordinate transformation circuit 32 the image data S14a that have been input from the whiteboard data generation unit 14. Furthermore, the interface 31 outputs the control data S14b coming from the whiteboard data generation unit 14 to at least one of the control circuit 22 and transmission processing circuit 37.

The coordinate transformation circuit 32 transforms a plurality of first-precision coordinate data (Xp, Yp) constituting the image data S14a input from the whiteboard data generation unit 14 via the interface 31, into coordinate data (Xq, Yq) (second location data of the invention) of a second precision (i.e., resolution) lower than the first precision, thereby generating coordinate data S32 (second image data of the invention) made up of the multiple coordinate data (Xq, Yq).

With this embodiment, the first precision is expressed in a coordinate system of 8,000 by 6,000 points, and the second precision in a coordinate system of 1,024 by 768 points, on the board unit 16a. The second precision is established illustratively on the basis of the display resolution of destination devices to which to transmit image data representative of patterns drawn on the whiteboard.

Given the multiple coordinate data (Xq, Yq) making up the coordinate data S32, the change point detection circuit 33 detects those pieces of coordinate data (Xq, Yq) which are changed in keeping with the locations being touched movably by the pen 17 on the board unit 16a, thereby generating image data S33 (third image data of the invention) including the detected coordinate data (Xq, Yq) in the sequence of the touch by the pen 17.

The transmission processing circuit 37 transforms the image data S33, control data S14b, image data S43, and audio data S45 into a communication format of a conference system protocol adopted for the conference system terminal devices of the conference system 1. The transformed data are transmitted via the interface 58 to the conference system terminal devices 3_2 through 3_4.

Figures 6A, 6B:
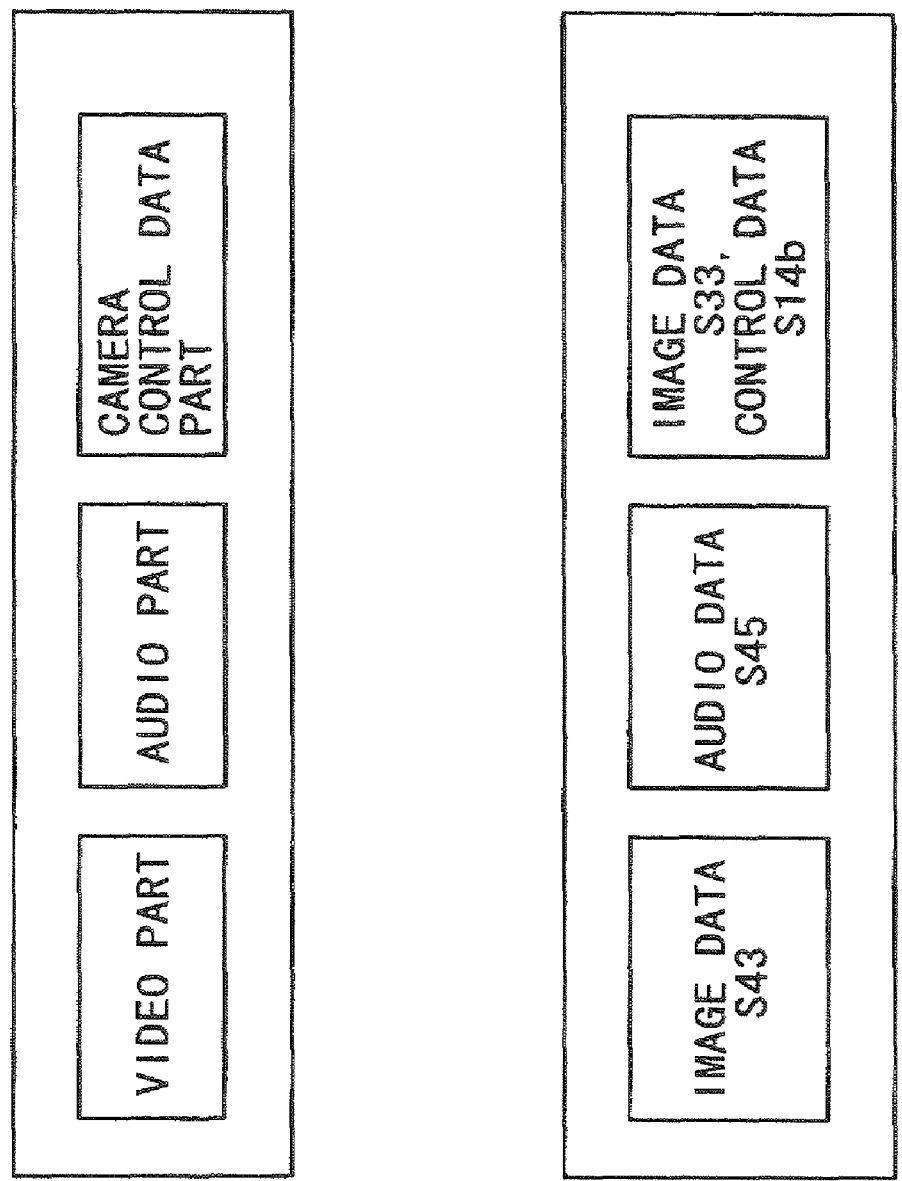
FIGS. 6A and 6B are explanatory views of conference system communication formats adopted by embodiments of this invention.

As the communication format, one of the formats stipulated by suitable conference system protocols (e.g., internationally standardized system H.320 or H.323) may be adopted. FIG. 6A is an explanatory view of a commonly utilized conference system protocol communication format. As shown in FIG. 6A, this communication format has a video part, an audio part, and a camera control data part constituting a data transfer format. The camera control data part accommodates camera control data for controlling the orientation of the camera attached to the conference system terminal device at the destination of data communication.

With this embodiment, as shown in FIG. 6B, the image data S43 are placed in the video part, the audio data S45 in the audio part, and the image data S33 as well as the control data S14b in the camera control data part of the communication format.

As described above, the conference system terminal device 3_1 transmits the image data S33 obtained by reducing the quantity of the image data S14a through the use of the coordinate transformation circuit 32 and change point detection circuit 33. This makes it possible for the camera control data part to fully accommodate the image data S33 despite a limited capacity of the part to hold data.

The memory 38 stores the image data S33. The transformation circuit 39 transforms the image data S33 retrieved from the memory 38 illustratively into a still image format (of JPEG: Joint Photographic Experts Group) so as to generate image data S39. The interface 40 receives the image data S39 from the transformation circuit 39 and writes the received data to a portable semiconductor recording medium or the like.

The image processing circuit 43 generates the image data S43 by subjecting to an imaging process the picture signal S12 coming from the camera 12 via the interface 42. The generated image data S43 are output to the transmission processing circuit 37.

The audio processing circuit 45 generates the audio data S45 by subjecting to an audio process the audio signal S13 input through the microphone 13 via the interface 44. The generated audio data S45 are output to the transmission processing circuit 37.

The image processing circuit 52 generates the image signal S53 compatible with the display unit 10 by subjecting to an imaging process image data S80 coming from the other conference system terminal devices 3_2 through 3_4 via the interface 58. The generated image signal S53 are output to the display unit 10 via the interface 53.

As needed, the image processing circuit 52 combines the image data S80 with image data S51 coming from the pixel skipping circuit 51 to generate a screen image signal S53. The generated screen image signal S53 is output to the display unit 10 through the interface 53.

The audio processing circuit 54 generates the audio signal S55 compatible with the speaker 11 by subjecting to an audio process audio data S81 input from the other conference system terminal devices 3_2 through 3_4 via the interface 58. The generated audio signal S55 is output to the speaker 11 through the interface 55.

[Screens on the Display Unit 10]

What follows is a description of screens appearing on the display unit 10 in accordance with the image data signal S53 generated by the image processing circuit 52 shown in FIG. 5. FIG. 7 is an explanatory view of a typical screen 10*a* appearing on the display unit 10 of the conference system terminal device 3_1 shown in FIG. 1.

As depicted in FIG. 7, the screen 10*a* on the display unit 10 of the conference system terminal device 3_1 displays face images 100_2, 100_3 and 100_4 of users 2_2, 2_3 and 2_4 in keeping with the image data S80 coming from the conference system terminal devices 3_2, 3_3 and 3_4, as well as a whiteboard image 103 reflecting the image data S14*a* from the whiteboard data generation unit 14.

The face images 100_2, 100_3 and 100_4 contain respectively switchover button images 101_2, 101_3 and 101_4 for switchover to whiteboard images sent from the whiteboard data generation units connected to the conference system terminal devices 3_2, 3_3 and 3_4.

The speaker 11 outputs voices pronounced by the users 2_2, 2_3 and 2_4 in synchronism with the face images 100_2, 100_3 and 100_4 respectively. Viewing the images on display and listening to the output voices, the user 2_1 can take part smoothly in the ongoing conference in collaboration with the users 2_2, 2_3 and 2_4.

FIG. 8 is an explanatory view of another typical screen 10*b* appearing on the display unit 10 of the conference system terminal device 3_2 shown in FIG. 1. As indicated in FIG. 8, the screen 10*b* on the display unit 10 of the terminal device 3_2 displays face images 110_1, 110_3 and 110_4 of the users 2_1, 2_3 and 2_4 in keeping with the image data coming from the conference system terminal devices 3_1, 3_3 and 3_4, as well as a whiteboard image 113 reflecting the image data from the whiteboard data generation unit 14 connected illustratively to the terminal device 3_2.

The face images 110_1, 110_3 and 110_4 contain respectively switchover button images 111_1, 111_3 and 111_4 for switchover to whiteboard images sent from the whiteboard data generation units connected to the conference system terminal devices 3_1, 3_3 and 3_4.

For example, if the user clicks on the button image 111_1 on the screen 10*b*, the face image 110_1 in FIG. 8 is replaced by a whiteboard image 131_1 corresponding to the image data S14*a* (in FIG. 5) from the conference system terminal device 3_1. As illustrated in FIG. 9, a switchover button image 132_1 for switchover to the face image 110_1 is displayed inside the whiteboard image 131_1. The screen in FIG. 8 is restored when the user clicks on the button image 132_1.

The speaker 11 outputs voices pronounced by the users 2_1, 2_3 and 2_4 in synchronism with the face images 110_1, 110_3 and 110_4 respectively.

How the conference system 1 typically works will now be described. It is assumed here that the conference system terminal device 3_1 processes image data coming from the whiteboard data generation unit 14 and transmits the processed data to the other conference system terminal devices 3_2, 3_3 and 3_4. Typical steps constituting the workings of the system, explained below with reference to FIGS. 10 and 11, are carried out illustratively when the conference system terminal device 3_1 enters the whiteboard mode.

Step ST1: In the whiteboard mode, the conference system terminal device 3_1 performs an initialization process in conjunction with the whiteboard data generation unit 14 preparatory to receiving image data from the unit 14. Specifically, the conference system terminal device 3_1 outputs an initialization request to the whiteboard data generation unit 14. In response to the request, the whiteboard data generation unit 14 carries out an appropriate initialization process and, at the end of the process, outputs a response to the conference system terminal device 3_1. On receiving the response from the whiteboard data generation unit 14, the conference system terminal device 3_1 outputs a data output start command to the whiteboard data generation unit 14.

Step ST2: The conference system terminal device 3_1 displays on the display unit 10 a screen prompting the user to select a pen tip thickness. Viewing the screen, the user operates the operation unit 21 to select a desired tip thickness for the pen. If there are a plurality of pens for drawing in different colors, the pen tip thickness needs to be designated for each of the different colors of the pens.

Step ST3: The conference system terminal device 3_1 displays on the display unit 10 a screen prompting the user initially to touch the pen 17 to the bottom right corner of the board unit 16*a* on the whiteboard 16. The location to be touched initially by the pen 17 on the board unit 16*a* is not limited to the bottom right corner. The location may be anywhere as long as it represents the coordinate data (X, Y) defining the highest coordinate values of the location of the pen 17 generated by the whiteboard data generation unit 14.

As prompted by the screen, the user touches the pen 17 to the bottom right corner 16*c* of the board unit 16*a* on the whiteboard 16 as shown in FIG. 4. The pen-touching action causes the whiteboard data generation unit 14 to output to the conference system terminal device 3_1 a command code indicating that the board unit 16a is touched by the pen 17, along with the coordinate data (Xs, Ys) representing the bottom right corner of the board unit 16a (i.e., precision-setting location data for this invention).

When the user later detaches the pen 17 from the board unit 16a, the whiteboard data generation unit 14 outputs to the conference system terminal device 3_1 a command code indicating the separation of the pen 17 from the board unit 16a. Given the coordinate data (Xs, Ys) from the whiteboard data generation unit 14, the control circuit 22 of the conference system terminal device 3_1 in FIG. 5 establishes the received coordinate data for the coordinate transformation circuit 32 shown in FIG. 5.

Step ST4: Following step ST3, the user starts drawing a pattern using the pen 17 on the board unit 16a of the whiteboard 16. As the pen 17 touches the board unit 16a, the whiteboard data generation unit 14 outputs control data S14b representative of the pen-to-board contact to the conference system terminal device 3_1. When holding the pen 17 by hand, the user first pushes the button mounted on the pen 17. The button-pushing action causes the whiteboard data generation unit 14 to output data denoting the pen color to the conference system terminal device 3_1.

Step ST5: The conference system terminal device 3_1 transmits data about the pen tip thickness set in step ST2 and the pen color data input in step ST4 to the other conference system terminal devices 3_2, 3_3 and 3_4 through the interface 58. In turn, each of the conference system terminal devices 3_2, 3_3 and 3_4 displays an image of a whiteboard pattern input from the terminal device 3_1 using the pen tip thickness and pen color designated by the thickness data and pen color data input from the terminal device 3_1.

Step ST6: While the pen 17 is being in contact with the board unit 16a, the whiteboard data generation unit 14 outputs to the conference system terminal device 3_1 the image data S14a including the coordinate data (Xp, Yp) indicating the locations at which the pen 17 is touching the board unit 16a. In this case, the image data S14a contain a plurality of coordinate data (Xp, Yp) representing the locations touched by the pen 17 on the board unit 16a in the sequence of the touch by the pen 17. The conference system terminal device 3_1 admits the image data S14a through the interface 31 shown in FIG. 5.

Step ST7: The interface 31 of the conference system terminal device 3_1 in FIG. 5 transfers to the coordinate transformation circuit 32 the image data S14a input in step ST6. The coordinate transformation circuit 32 transforms the multiple coordinate data (Xp, Yp) making up the input image data S14a into coordinate data (Xq, Yq) of the second precision lower than the first precision. More specifically, the coordinate data (Xp, Yp) expressing locations on the board unit 16a in the coordinate system of 8,000 by 6,000 points are transformed by the coordinate transformation circuit 32 into second-precision coordinate data (Xq, Yq) in the coordinate system of 1,024 by 768 points. The coordinate transformation circuit 32 outputs to the change point detection circuit 33 the coordinate data S32 composed of the multiple coordinate data (Xq, Yq) corresponding to the multiple coordinate data (Xp, Yp).

Step ST8: Given the multiple coordinate data (Xq, Yq) constituting the coordinate data S32, the change point detection circuit 33 of the conference system terminal device 3_1 detects those pieces of coordinate data (Xq, Yq) which are changed in keeping with the locations being touched movably by the pen 17 on the board unit 16a, thus generating the image data S33 containing the detected coordinate data (Xq, Yq) in the touched sequence.

The change point detection circuit 33 outputs the image data S33 to the transmission processing circuit 37. The change point detection circuit 33 also writes the image data S33 to the memory 38 and, where necessary, outputs the data S33 to the pixel skipping circuit 51.

Step ST9: The transmission processing circuit 37 of the conference system terminal device 3_1 transforms the image data S33 input from the change point detection circuit 33 into a suitable format stipulated for the conference system. The transformed data are transmitted to the conference system terminal devices 3_2 through 3_4 via the interface 58 and over the network 5.

Furthermore, the transmission processing circuit 37 transfers the image data S43 from the image processing circuit 43 and the audio data S45 from the audio processing circuit 45 to the conference system terminal devices 3_2 through 3_4 via the interface 58 and over the network 5.

When the pen 17 is detached from the board unit 16a, the whiteboard data generation unit 14 generates the control data S14b indicating the separation of the pen 17 from the board unit 16a, and outputs the generated data to the conference system terminal device 3_1. Given the control data S14b, the terminal device 3_1 stops the processing of the coordinate transformation circuit 32 and change point detection circuit 33 accordingly.

Step ST10: The pixel skipping circuit 51 generates the image data S51 by performing pixel skipping on the image data S33 input in step ST9, and outputs the generated data S51 to the image processing circuit 52.

Step ST11: The image processing circuit 52 combines the image data S80 input from the other conference system terminal devices 3_2 through 3_4 via the interface 58, with the image data S51 input from the pixel skipping circuit in step ST10, so as to generate the screen image signal S53. The generated image signal S53 is output to the display unit 10 via the interface 53. Alternatively, the image processing circuit 52 may generate the screen image data S53 based solely on the image data S80 without using the image data S51.

Step ST12: The control circuit 22 of the conference system terminal device 3_1 determines whether the whiteboard mode is brought to an end. If the whiteboard mode is found to be terminated, the control circuit 22 goes step ST13; otherwise step ST6 is reached again.

That is, the conference system terminal device 3_1 repeats steps ST6 through ST11 while the whiteboard mode is being in effect. During that time, the terminal device 3_1 repeats transmission and display of the image data S33 in units of a predetermined data quantity or at intervals of a predetermined time period. The control circuit 22 terminates the whiteboard mode in response to a stop request entered through the operation unit 21 or received from any one of the conference system terminal devices 3_2 through 3_4.

Step ST13: In accordance with predetermined settings or in response to the user's operation on the operation unit 21, the conference system terminal device 3_1 retrieves the image data S33 from the memory 38, and outputs the retrieved data S33 to the transformation circuit 39. The transformation circuit 39 transforms the image data S33 from the memory 38 illustratively into a still image format (of JPEG) so as to generate the image data S39. The interface 40 receives the image data S39 from the transformation circuit 39 and writes the received data S39 to a portable semiconductor recording medium or the like.

Step ST21: Each of the conference system terminal devices 3_2 through 3_4 causes the image processing circuit 52 to process the image data S80 (image data S43, S33) input from the terminal device 3_1 via the interface 58 shown in FIG. 5. The processed image data are output to the display unit 10 via the interface 53. In turn, the display unit 10 of, say, the conference system terminal device 3_2 displays the screen 10b described above with reference to FIGS. 8 and 9.

Furthermore, each of the conference system terminal devices 3_2 through 3_4 causes the audio processing circuit 54 to process the audio data S81 (audio data S45) input from the terminal device 3_1 via the interface 58 shown in FIG. 5. The processed audio data are output to the speaker 11 via the interface 53.

With the inventive conference system 1 in use, as described above, the locations touched by the pen 17 on the board unit 16a are represented by those pieces of coordinate data (Xp, Yp) of the first precision which are included in the image data S14a input from the conference system terminal device 3_1. The coordinate transformation circuit 32 transforms the coordinate data (Xp, Yp) into the coordinate data (Xq, Yq) of the second precision lower than the first precision, thereby generating the image data S32.

Given the coordinate data (Xq, Yq) constituting the coordinate data S32, the change point detection circuit 33 detects those pieces of coordinate data (Xq, Yq) which are changed in keeping with the locations being touched movably by the pen 17 on the board unit 16a, thus generating the image data S33 containing the detected coordinate data (Xq, Yq) in the touched sequence.

The arrangement above significantly reduces the amount of the image data S33 to be sent to the conference system terminal devices 3_2 through 3_4, compared with the image data S14a. That in turn makes it possible to reduce the overall quantity of communications between the configured terminal devices of the conference system. As described above with reference FIG. 6, the image data S14a can be placed in the camera control data part of a suitable communication format stipulated for the conference system. That means the whiteboard data can be exchanged between the terminal devices using an existing communication format.

Although the description above contains many specificities, these should not be construed as limiting the scope of the invention but as merely providing illustrations of the presently preferred embodiment of this invention. It is to be understood that changes and variations may be made without departing from the spirit or scope of the claims that follow. For example, although the above embodiment was shown having the interface 31, coordinate transformation circuit 32, and change point detection circuit 33 implemented in each of the conference system terminal devices for reducing the amount of image data exchanged therebetween, this is not limitative of the invention. Alternatively, these circuits and arrangements may be incorporated in data processing devices other than the conference system terminal devices.

The embodiment above was shown to be the conference system 1 working on an MCU (multi-control-unit) basis, i.e., operating with three or more units of control in place. Alternatively, the invention may be applied to cases where two terminal devices communicate with each other.

The above embodiment was shown adopting the board unit of the whiteboard as the visualization area of the invention. Alternatively, the visualization area may be a tablet as small as a notebook.

The embodiment above was shown including one display unit 10 per terminal device. Alternatively, each terminal device may utilize two display units, one unit showing face images of the participants in the conference in divided screen areas, the other unit displaying a whiteboard image. As another alternative, the participants' face images and the whiteboard image may be switched by a suitable operation on a single display unit.

The transmission processing circuit 37 of the conference system terminal device 3_1 may be structured to change the rate of transfer of whiteboard drawing data by use of suitable settings. Illustratively, if there are few movements in the image taken by camera, the transmission processing circuit 37 may be set automatically to modify the parameters of the coordinate transformation circuit 32 to comply with a transfer rate suitable for the ongoing display. This allows the transmission line capacity to be utilized efficiently depending on how the conference is being conducted.

It is possible to raise the resolution of the data that represent patterns drawn on the whiteboard by changing the image data size in the memory 38.

Where the conference is to be held by a system including two or more interconnected terminal devices, each terminal device may incorporate a change point detection circuit for changing the amount of data flowing through each terminal on the network. This makes it possible for each networked terminal device with its unique operating environment to optimize its data flow conforming to the environment specificities.

As a further application of this invention, documents may be distributed in the form of still images to the participants in the conference. The speaker may then get a specific document pasted on the whiteboard and marked with symbols where needed using a pen, or have a necessary document projected onto the whiteboard as a still image so that written explanations may be added onto the displayed image. This arrangement allows all participants in the conference simultaneously to share any documents with supplementary writing added to them.

As another alternative, the conference system 1 may be structured to let multiple users in different locations draw patterns on a single whiteboard. In this case, a whiteboard screen may be projected using a projector to let the users draw what they want on the projected screen.

As a further alternative, the minutes of the proceedings, written on the whiteboard during the conference for display, may be checked remotely where needed by each participant. The checked items or data may then be highlighted by the conference system 1 using specific markings on the whiteboard display.

What is claimed is:

1. A data processing apparatus for generating image data representative of a visually perceptible pattern drawn inside a two-dimensional visualization area by visualizing means being moved therein so as to designate locations in a designated sequence within the area, said data processing apparatus comprising:

inputting means for inputting first image data including a plurality of first location data which denote, with a first precision, the locations designated by said visualizing means in said designated sequence within said visualization area;

transforming means for transforming said first location data included in said first image data input by said inputting means, into second location data with a second precision lower than said first precision, therein generating second image data, wherein said second precision based upon resolution of an output device;

change detecting means which, given said second location data in said second image data generated by said transforming means, detects those pieces of second location data which are changed in keeping with said designated locations being moved, therein generating third image data, including the detected second location data, in said designated sequence; and transmitting means for transmitting said third image data, generated by said change detecting means, in a camera control data part of a communication format.

2. A data processing apparatus according to claim 1, wherein said inputting means further inputs color data denoting a color of said pattern drawn by said visualizing means in said visualization area; and wherein said transmitting means transmits said color data in association with said third image data.

3. A data processing apparatus according to claim 1, further comprising:

image processing means for generating screen data based on received fourth image data; and audio processing means for generating an audio signal based on received audio data;

wherein said transmitting means transmits picture data coming from an imaging device, audio data input through a microphone, and said third image data generated by said change detecting means, in a mutually associated manner to a source having transmitted said fourth image data.

4. A data processing apparatus according to claim 1, wherein, within a two-dimensional coordinate system having two coordinate axes constituted by a long and a short side of said visualization area in which said visualizing means designates a location denoting maximum coordinates along said two coordinate axes, said inputting means inputs precision-setting location data representative of the location designated by said visualizing means for use in setting said first precision; and wherein said transforming means determines a size of said visualization area based on said precision-setting location data input by said inputting means, before carrying out the data transformation in accordance with the determined size.

5. A data processing method for generating image data representative of a visually perceptible pattern drawn inside a two-dimensional visualization area by visualizing means being moved therein so as to designate locations in a designated sequence within the area, said data processing method comprising the steps of:

inputting first image data including a plurality of first location data which denote, with a first precision, the locations designated by said visualizing means in said designated sequence within said visualization area;

transforming said first location data included in said first image data, into second location data with a second precision lower than said first precision, therein generating second image data, wherein said second precision based upon resolution of a display device;

detecting those pieces of second location data which are changed in keeping with said designated locations being moved, of said second location data in said second image data generated in said transforming step, therein generating third image data including the detected second location data in said designated sequence; and transmitting said third image data, generated in said detecting step, in a camera control data part of a communication format.

6. A data processing method according to claim 5, wherein said inputting step further inputs color data denoting a color of said pattern drawn by said visualizing means in said visualization area; and wherein said transmitting step transmits said color data in association with said third image data.

7. A data processing method according to claim 5, further comprising the steps of:

generating screen data based on received fourth image data; and generating an audio signal based on received audio data;

wherein said transmitting step transmits picture data coming from an imaging device, audio data input through a microphone, and said third image data generated in said detecting step, in a mutually associated manner to a source having transmitted said fourth image data.

8. A data processing method according to claim 5, wherein, within a two-dimensional coordinate system having two coordinate axes constituted by a long and a short side of said visualization area in which said visualizing means designates a location denoting maximum coordinates along said two coordinate axes, said inputting step inputs precision-setting location data representative of the location designated by said visualizing means for use in setting said first precision; and wherein said transforming step determines a size of said visualization area based on said precision-setting location data, before carrying out the data transformation in accordance with the determined size.

* * * * *